(12) United States Patent
Hsu et al.

(10) Patent No.: US 10,824,190 B1
(45) Date of Patent: Nov. 3, 2020

(54) TILED DISPLAY

(71) Applicant: AU Optronics Corporation, Hsin-Chu (TW)

(72) Inventors: Ming-Chang Hsu, Hsin-Chu (TW); Kuei-Ning Cheng, Hsin-Chu (TW); Shou-Te Hsu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/702,098

(22) Filed: Dec. 3, 2019

(51) Int. Cl.
*G06F 1/16* (2006.01)
*H01L 51/52* (2006.01)
*G06F 3/14* (2006.01)

(52) U.S. Cl.
CPC .......... *G06F 1/1616* (2013.01); *G06F 3/1446* (2013.01); *H01L 51/5284* (2013.01)

(58) Field of Classification Search
CPC ... G06F 1/1616; G06F 3/1446; H01L 51/5284
See application file for complete search history.

(56) References Cited

U.S. PATENT DOCUMENTS

| 2006/0138913 | A1 | 6/2006 | Kim et al. | |
|---|---|---|---|---|
| 2007/0001927 | A1* | 1/2007 | Ricks | G09F 9/3026 345/1.1 |
| 2007/0262916 | A1* | 11/2007 | Kee | G02F 1/13336 345/1.3 |
| 2012/0236484 | A1 | 9/2012 | Miyake | |
| 2014/0049450 | A1* | 2/2014 | Manning | G06F 1/1679 345/1.3 |

FOREIGN PATENT DOCUMENTS

| TW | M559038 U | 4/2018 |
|---|---|---|
| TW | M565809 U | 8/2018 |
| WO | 2018030801 A1 | 2/2018 |

OTHER PUBLICATIONS

Office Action issued by the German Patent and Trademark Office dated Jun. 5, 2020 for Application No. 10 2020 106 273.7.

* cited by examiner

*Primary Examiner* — Abhishek Sarma
(74) *Attorney, Agent, or Firm* — Tim Tingkang Xia, Esq.; Locke Lord LLP

(57) ABSTRACT

A tiled display includes two supporting plates, two display panels respectively disposed on and connected to the two supporting plates, and a folding structure between the two display panels. Each display panel has an outer black matrix (BM) area and an inner BM area. The folding structure includes a rotation structure rotatably fixed to inner ends of the two supporting plates, and a flexible connecting film respectively connected to the inner BM areas of the display panels. The display panels and the supporting plates rotate around the folding structure such that the tiled display is switched between a first state and a second state. The rotation structure and the supporting plates are disposed on two different sides of the flexible connecting film. In the first state, the two display panels are located on a display plane. In the second state, the two display panels are parallel to each other.

15 Claims, 21 Drawing Sheets

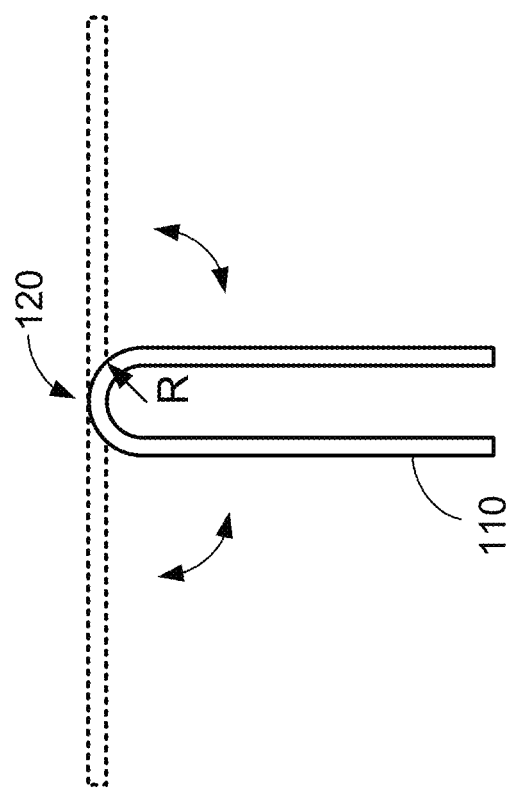

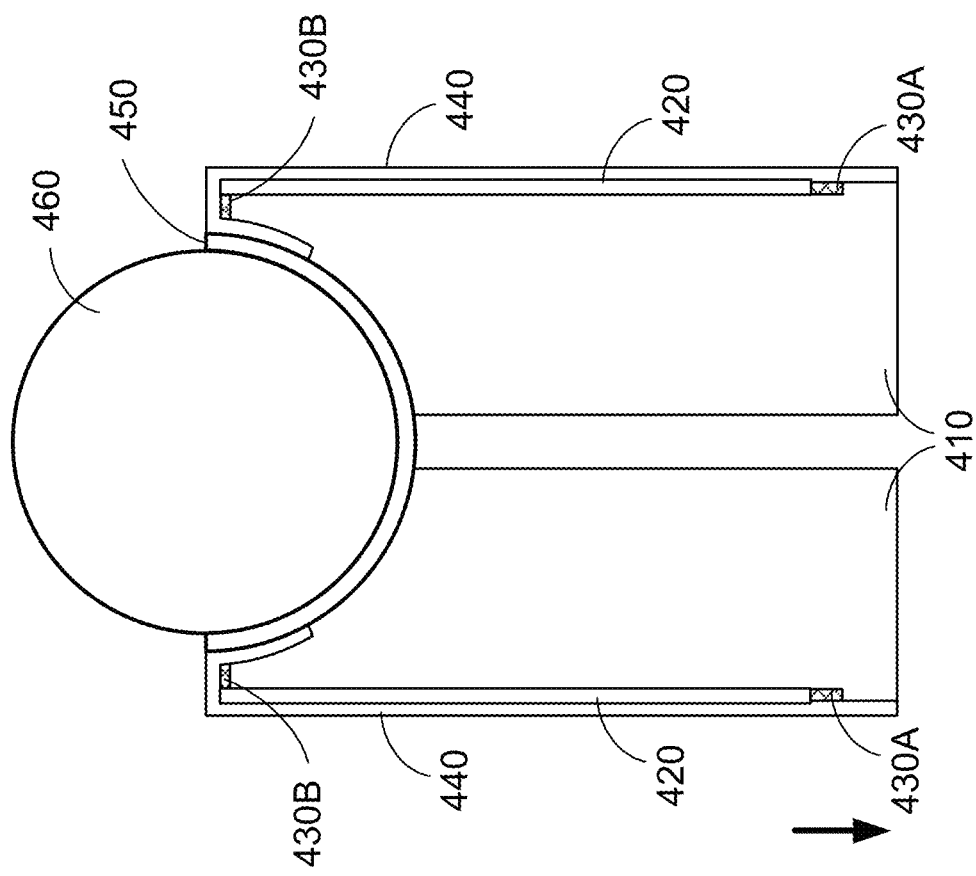

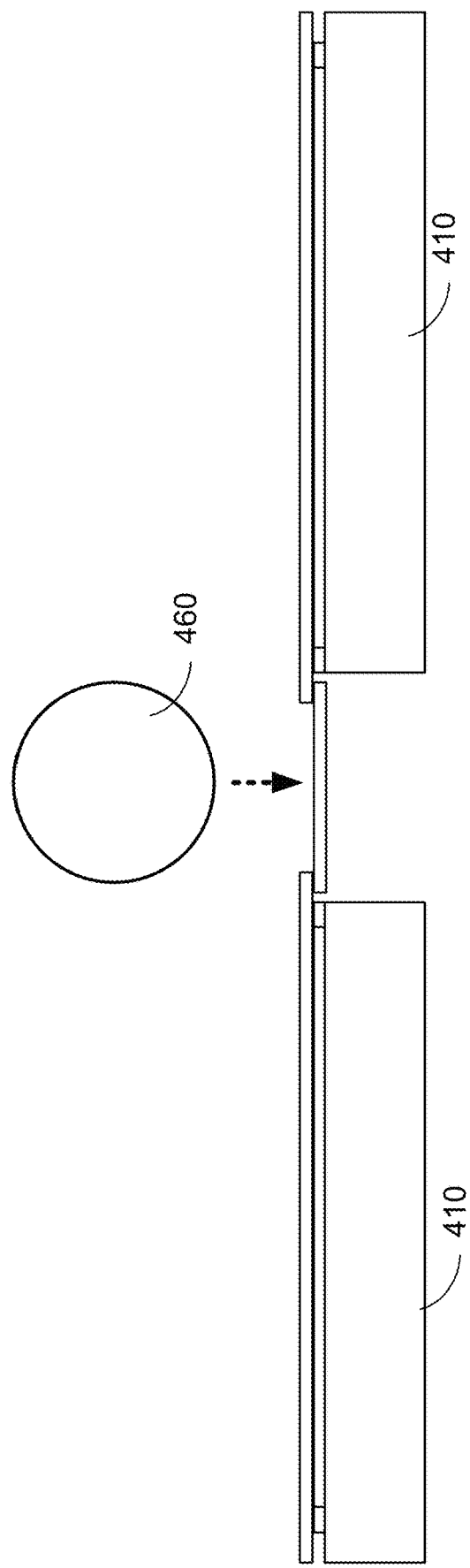

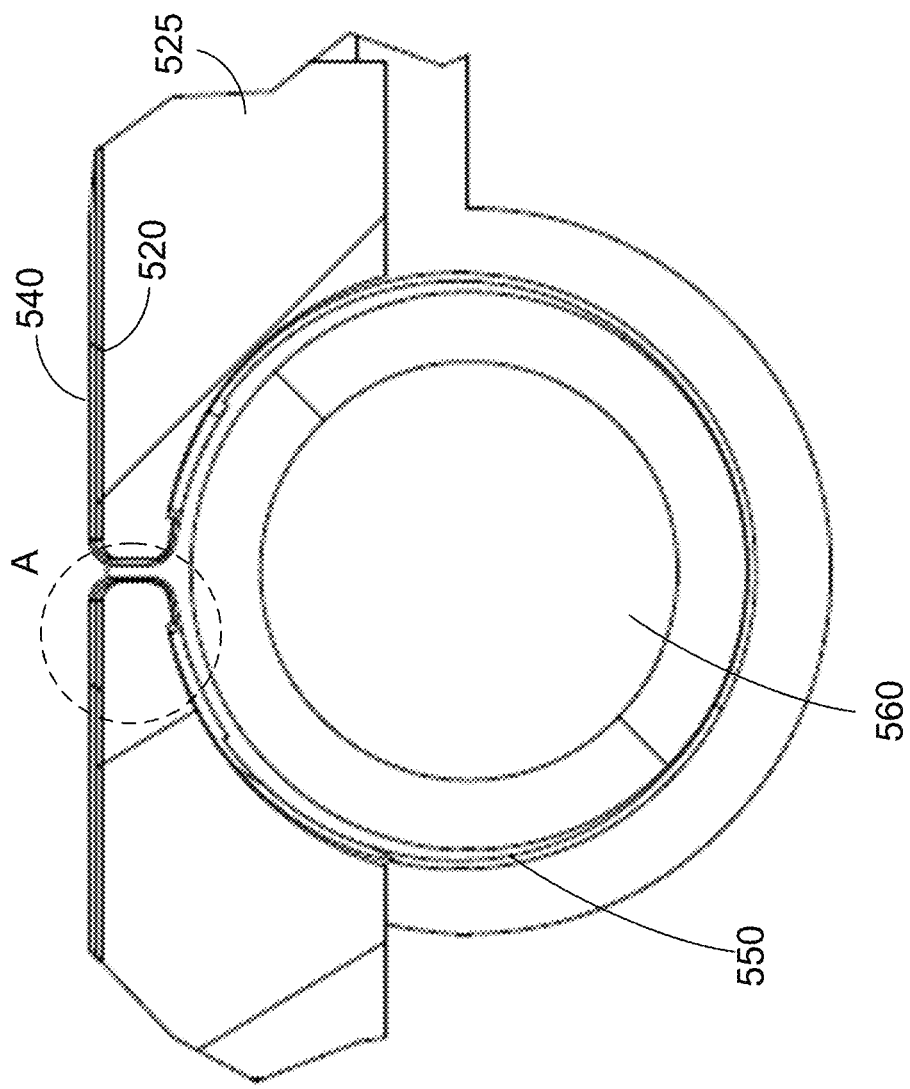

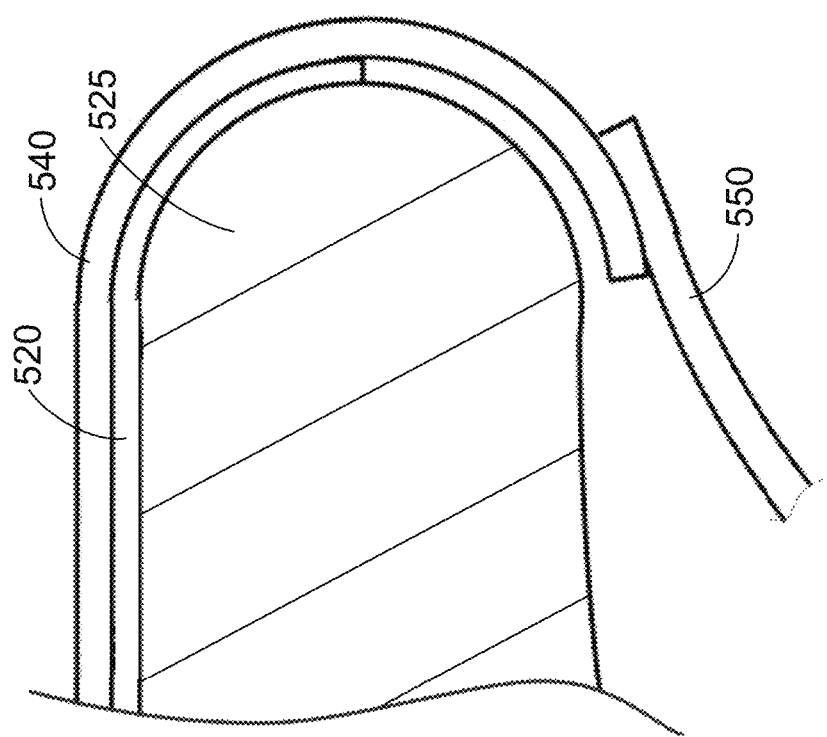

TILED DISPLAY

FIELD

The disclosure relates generally to display technology, and more particularly to a tiled display.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, flexible display devices has been used in mobile devices such as cell phones or tablet devices. In some cases, a flexible display device may be a foldable display, which may switch between a flat state and a folded state. However, the foldable display may easily crack or break due to tension stress or material fatigue.

Therefore, a heretofore unaddressed need exists in the art to address the aforementioned deficiencies and inadequacies.

SUMMARY

One aspect of the disclosure relates to a tiled display, which includes: two supporting plates, each of the two supporting plates having an outer end and an inner end; two display panels respectively disposed on and connected to the two supporting plates, wherein each of the two display panels has an outer black matrix (BM) area, an inner BM area, and a display area between the outer BM area and the inner BM area; and a folding structure provided in a folding area between the two display panels. In certain embodiments, the folding structure includes: a rotation structure rotatably fixed to the inner ends of the two supporting plates, wherein the two display panels and the two supporting plates are configured to rotate around the folding structure such that the tiled display is switched between a first state and a second state; and a flexible connecting film having two ends respectively connected to the inner BM areas of the two display panels, wherein the rotation structure and the two supporting plates are disposed on two different sides of the flexible connecting film. When the tiled display is in the first state, the two display panels are rotated around the folding structure to be located on a display plane, the rotation structure is located below the display plane, and the flexible connecting film wraps and stretches around the rotation structure to generate a pulling force pulling the inner BM areas of the two display panels downward from the display plane, such that the display areas of the two display panels are adjacent to each other. When the tiled display is in the second state, the two display panels are rotated around the folding structure to be parallel to each other, and the flexible connecting film is released and does not generate the pulling force, such that each of the two display panels return to an original state thereof.

In certain embodiments, each of the two display panels is an organic light emitting diode (OLED) display panel.

In certain embodiments, the flexible connecting film is made of a flexible polymer or metal material.

In certain embodiments, the flexible connecting film has a thickness of less than 200 um.

In certain embodiments, the flexible connecting film has a Young's modulus of E=10~70 MPa.

In certain embodiments, the rotation structure is a cylinder structure.

In certain embodiments, a coating is provided on the rotation structure to reduce friction between the rotation structure and the flexible connecting film.

In certain embodiments, the outer BM area of each of the two display panels is connected to the outer end of a corresponding one of the two supporting plates.

In certain embodiments, the tiled display further includes: two elastic springs correspondingly disposed on the two supporting plates, each of the elastic springs connecting one of the two display panels and a corresponding one of the two supporting plates; wherein when the tiled display is in the first state, the pulling force generated by the flexible connecting film pulls the two display panels to move toward each other, pulling the two elastic springs to stretch and generate elastic forces; and wherein when the tiled display is in the second state, the elastic forces of the two elastic springs pulls the two display panels to move back to the original state thereof.

In certain embodiments, the tiled display further includes: two frames, correspondingly fixed to the two display panels; wherein each of the elastic springs has a first end and a second end, the first end of each of the elastic springs is connected to a corresponding one of the two frames fixed to the one of the two display panels, and the second end of each of the elastic springs is connected to the corresponding one of the two supporting plates; wherein when the tiled display is in the first state, the pulling force generated by the flexible connecting film pulls the two display panels and the two frames to move toward each other, pulling the two elastic springs to stretch and generate elastic forces; and wherein when the tiled display is in the second state, the elastic forces of the two elastic springs pulls the two display panels and the two frames to move back to the original state thereof.

In certain embodiments, the tiled display further includes: two sliding mechanisms, correspondingly disposed between the two frames and the two supporting plates; wherein when the tiled display is in the first state, the pulling force generated by the flexible connecting film pulls the two display panels and the two frames, such that the two sliding mechanisms enable the two display panels and the two frames to slide toward each other, pulling the two elastic springs to stretch and generate elastic forces; and wherein when the tiled display is in the second state, the elastic forces of the two elastic springs pulls the two display panels and the two frames, such that the two sliding mechanisms enable the two display panels and the two frames to slide back to the original state thereof.

In certain embodiments, each of the two sliding mechanisms includes: a sliding rail, disposed on and fixed to a corresponding one of the two frames; and at least one sliding block, fixed to a corresponding one of the two supporting plates, and configured to slide in the sliding rail.

In certain embodiments, the tiled display further includes: two cover films respectively disposed on the two display panels, wherein the flexible connecting film are connected to the inner BM areas of the two display panels by the two cover films.

In certain embodiments, a distance between the two display panels is between 100 um and 550 um.

In certain aspects of the disclosure, a portable device may having the tiled display as discussed above.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 1 schematically shows a foldable display according to certain embodiments of the present disclosure.

FIG. 4B schematically shows a tiled display in a folded state according to certain embodiments of the present disclosure.

FIGS. 6A-6C schematically show an assembly process of the tiled display as shown in FIGS. 4A and 4B according to certain embodiments of the present disclosure.

FIG. 9A shows an enlarged view of the folding structure of the tiled display according to certain embodiments of the present disclosure.

FIG. 9B shows an enlarged view of the portion A of FIG. 9A.

DETAILED DESCRIPTION OF THE DISCLOSURE

Figure 2B:
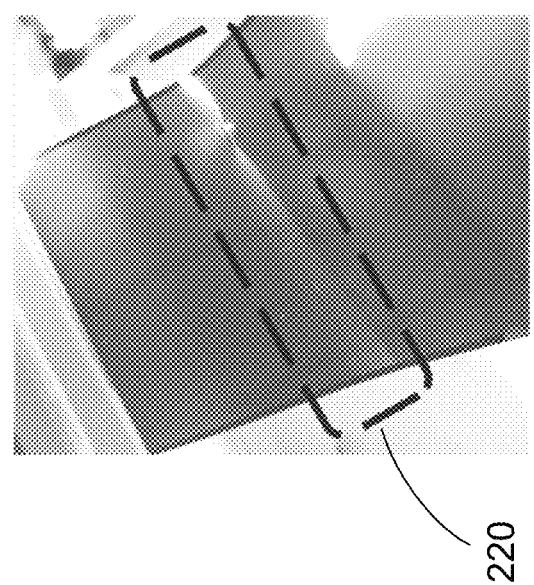
FIG. 2B shows deflection formed in the foldable display due to material fatigue according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a display device structure for wireless communication having one or more antennas on the side surface thereof.

FIG. 1 schematically shows a foldable display according to certain embodiments of the present disclosure. As shown in FIG. 1, the foldable display 100 includes a foldable region 120 and two flat regions 110 at two sides of the foldable region 120, such that the foldable display may switch between a flat state (shown in dashed lines) and a folded state (shown in solid lines). In this case, as shown in FIG. 1, the foldable display 100 in the folded state may be limited to have a minimum thickness, which is twice the radius R of the foldable region in the folded state.

Figure 2A:
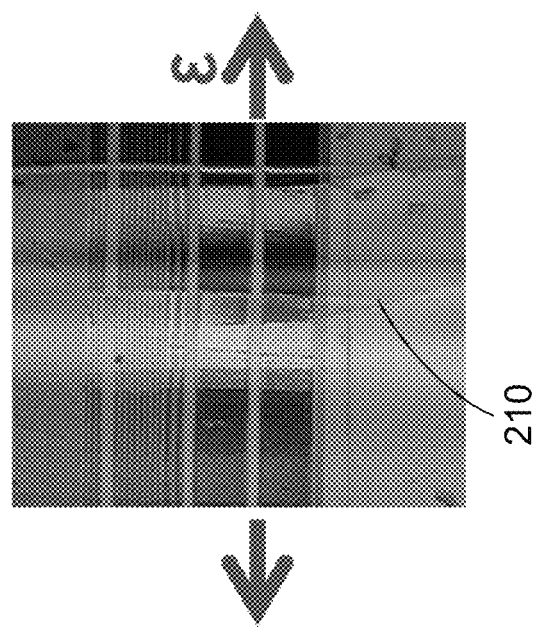
FIG. 2A shows cracks formed in the foldable display due to tension stress according to certain embodiments of the present disclosure.

As described above, the foldable display may easily crack or break due to tension stress or material fatigue. Generally, the cracking or breaking occurs in the foldable region 120. For example, FIG. 2A shows cracks formed in the foldable display due to tension stress according to certain embodiments of the present disclosure. As shown in FIG. 2A, cracking 210 may occur in the foldable region due to the tension stress E. This tension stress-induced cracking issue becomes more serious when the radius of the foldable region in the folded state is reduced. For example, when the radius R is less than 4 mm, the risk of cracking significantly increases. This limits the thickness of the foldable display in the foldable to be no less than 8 mm (=2*4 mm). Further, FIG. 2B shows deflection formed in the foldable display due to material fatigue according to certain embodiments of the present disclosure. As shown in FIG. 2A, deflection due to material fatigue may occur in the foldable region 220 may be deflected after thousands of folding.

Figure 3A:
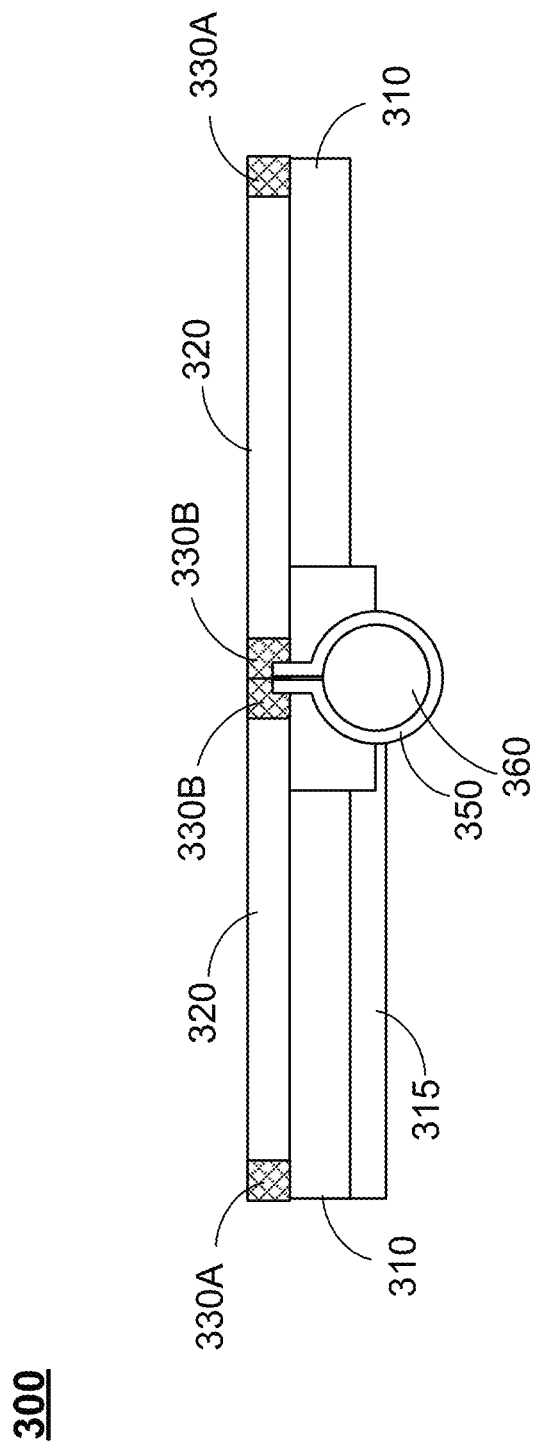
FIG. 3A schematically shows a tiled display in a flat state according to certain embodiments of the present disclosure.
Figure 3B:
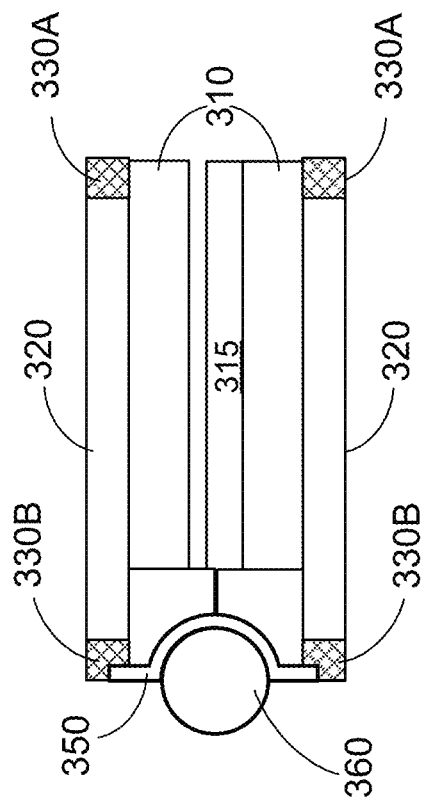
FIG. 3B schematically shows a tiled display in a folded state according to certain embodiments of the present disclosure.

In view of the above deficiencies, one aspect of the present disclosure relates to a tiled display, which adopts a folding structure between two tiled display panels in order to avoid the issues in the foldable display. For example, FIGS. 3A and 3B schematically show a tiled display according to certain embodiments of the present disclosure, where FIG. 3A shows the tiled display in a flat state (i.e., a first state), and FIG. 3B shows the tiled display in a folded state (i.e., a second state). As shown in FIGS. 3A and 3B, the tiled display includes two supporting plates 310, two display panels 320, a flexible connecting film 350 and a rotation structure 360. In certain embodiments, each of the two display panels 320 can be an organic light emitting diode (OLED) display panel. Specifically, the flexible connecting film 350 and the rotation structure 360 collectively form a folding structure, and the two supporting plates 310 and the two display panels 320 are correspondingly provided at the two sides of the folding structure.

The two supporting plates 310 are provided for correspondingly supporting the display panels 320 and other mechanisms of the tiled display 300. As shown in FIG. 3A, the supporting plate 310 on the left side further includes an accessory portion 315, which may include components such as a battery, computer extension boards, or other components necessary for a portable device, such as a mobile device or a tablet device. Each of the two supporting plates 310 has an outer end (the outermost left end and the outermost right end as shown in FIG. 3A) and an inner end (the inner end near the folding structure as shown in FIG. 3A). The two display panels 320 are respectively disposed on the two supporting plates 310. Each display panel 320 has an outer black matrix (BM) area 330A and an inner BM area 330B, and the area of the display panel 320 between the outer BM area 330A and the inner BM area 330B is a display area. The outer BM area 330A is connected to the outer end of the corresponding supporting plate 310. The inner BM area 330B is connected to the flexible connecting film 350. The rotation structure 360 can be a cylinder structure having a circular-shaped cross-section, which is rotatably fixed to the inner ends of the two supporting plates 310. The flexible connecting film 350 has two ends respectively connected to the inner BM areas 330B of the two display panels 320. In this case, the rotation structure 360 and the two supporting plates 310 are disposed on two different sides of the flexible connecting film 350, allowing the two display panels 320 and the two supporting plates 310 to rotate around the folding structure such that the tiled display 300 is switched between the flat state as shown in FIG. 3A and the folded state as shown in FIG. 3B.

As shown in FIG. 3A, when the tiled display 300 is in the flat state, the two display panels 320 and the two supporting plates 310 are rotated around the folding structure to be located on a display plane, which is a flat plane. In this case, the rotation structure 360 is located below the display plane. Meanwhile, the flexible connecting film 350 wraps and stretches around the rotation structure 360 to generate a pulling force for each of the display panels 320. Since the outer BM areas 330A of the two display panels 320 are correspondingly fixed to the outer ends of the supporting plates 310, the pulling force generated by the flexible connecting film 350 would pull the inner BM area 330B of each of the two display panels 320 to stretch and move inward and then downward from the display plane, such that the display areas of the two display panels 320 are located to be adjacent to each other to reduce a gap between the two display panels 320.

As shown in FIG. 3B, when the tiled display 300 is in the folded state, the two display panels 320 and the two supporting plates 310 are rotated around the folding structure to be parallel to each other. In this case, the flexible connecting film 350 does not need to stretch around the rotation structure 360, and is thus released and does not generate the pulling force, such that each of the two display panels 320 are released from the pulling force to return to an original state thereof.

As discussed above, the flexible connecting film 350 is released when the tiled display 300 is in the folded state, and when the tiled display 300 is switched to the flat state, the flexible connecting film 350 wraps and stretches around the rotation structure 360 to generate the pulling force F for each of the display panels 320 and the cover films 340. In certain embodiments, the flexible connecting film 350 can be made of a flexible polymer or metal material, which has a Young's modulus of E=10~70 MPa. In one embodiment, the flexible connecting film has a thickness of less than 200 um.

Further, as discussed above, when the tiled display 300 is switched to the flat state, the flexible connecting film 350 wraps and stretches around the rotation structure 360 to generate the pulling force. In certain embodiments, a coating may be provided on the outer surface of the rotation structure 360 to reduce friction between the rotation structure 360 and the flexible connecting film 350.

Compared to the flexible display 100 as shown in FIG. 1, the tiled display 300 utilized the folding structure, which includes the flexible connecting film 350 and the rotation structure 360, to perform folding. Thus, the actual folding process is done by the folding structure, thus greatly reducing the flexible folding actions to the display panels 320, which may prevent the cracking or breaking issues on the display panels 320. Further, the flexible connecting film 350 is provided to merely perform the stretching and folding actions, without providing the display functions. In this case, the flexibility of the flexible connecting film 350 can be further enhanced to sustain the tension stress, allowing the radius of the rotation structure 360 to be further reduced.

Figure 4A:
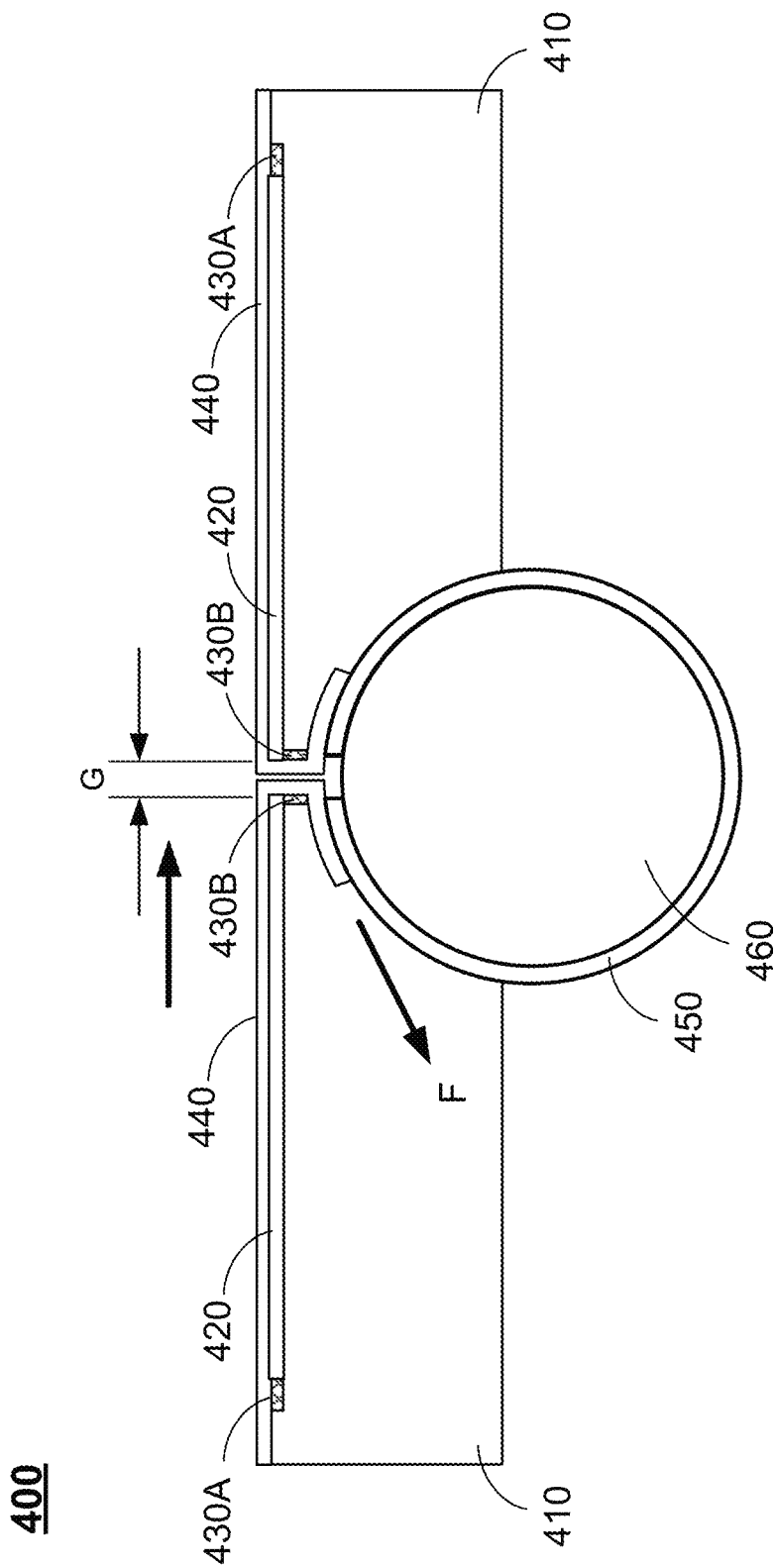
FIG. 4A schematically shows a tiled display in a flat state according to certain embodiments of the present disclosure.

In certain embodiments, instead of using the inner BM area 330B to be directly connected to the flexible connecting film 350, an additional film structure may used to connect the inner BM area to the flexible connecting film. For example, FIGS. 4A and 4B schematically show a tiled display according to certain embodiments of the present disclosure, where FIG. 4A shows the tiled display in a flat state, and FIG. 4B shows the tiled display in a folded state. Specifically, the embodiment as shown in FIGS. 4A and 4B is different from the embodiment as shown in FIGS. 3A and 3B in that two cover films 440 are provided to cover the display panels 420. In addition, no accessory portion is provided in the embodiment as shown in FIGS. 4A and 4B. As shown in FIGS. 4A and 4B, the tiled display 400 includes two supporting plates 410, two display panels 420, two cover films 440, a flexible connecting film 450 and a rotation structure 460. Specifically, the flexible connecting film 450 and the rotation structure 460 collectively form a folding structure, and the two supporting plates 410, the two display panels 420 and the two cover films 440 are correspondingly provided at the two sides of the folding structure.

The two supporting plates 410 are provided for correspondingly supporting the display panels 420 and other mechanisms of the tiled display 400. The two display panels 420 are respectively disposed on the two supporting plates 410. Each display panel 420 has an outer BM area 430A and an inner BM area 430B, and the area of the display panel 420 between the outer BM area 430A and the inner BM area 430B is a display area. The outer BM area 430A is connected to the outer end of the corresponding supporting plate 410. The inner BM area 430B is indirectly connected to the flexible connecting film 450 by the corresponding cover film 440. Each cover film 440 is a transparent film covering the display side (i.e., the upper side as shown in FIG. 4A) of the display panel 420, where an outer side of the cover film 440 is fixedly attached to the corresponding supporting plate 410, and the inner side of the cover film 440 is used to fix the corresponding inner BM area 430B to the flexible connecting film 450. The rotation structure 460 can be a cylinder structure having a circular-shaped cross-section, which is rotatably fixed to the inner ends of the two supporting plates 410. The flexible connecting film 450 has two ends respectively connected to the inner BM areas 430B of the two display panels 420. In this case, the rotation structure 460 and the two supporting plates 410 are disposed on two different sides of the flexible connecting film 450, allowing the two display panels 420 and the two supporting plates 410 to rotate around the folding structure such that the tiled display 400 is switched between the flat state as shown in FIG. 4A and the folded state as shown in FIG. 4B.

As shown in FIG. 4A, when the tiled display 400 is in the flat state, the two display panels 420 and the two supporting plates 410 are rotated around the folding structure to be located on a flat display plane. In this case, the rotation structure 460 is located below the display plane. Meanwhile, the flexible connecting film 450 wraps and stretches around the rotation structure 460 to generate a pulling force F for each of the display panels 420 and the cover films 440. Since the outer end of the cover films 440 and the outer BM areas 430A of the two display panels 420 are correspondingly fixed to the outer ends of the supporting plates 410, the pulling force generated by the flexible connecting film 450 would pull the cover films 440 and the inner BM area 430B of each of the two display panels 420 to stretch and move inward and then downward from the display plane, such that the display areas of the two display panels 420 are located to be adjacent to each other, and a gap G between the display areas of the two display panels 420 is reduced. In certain embodiments, the size of the gap G may be between 100 um and 550 um. In other words, the distance between the two display panels can be equal to or more than 100 um, and equal to or less than 550 um.

As shown in FIG. 4B, when the tiled display 400 is in the folded state, the two display panels 420 and the two supporting plates 410 are rotated around the folding structure to be parallel to each other. In this case, the flexible connecting film 450 is released and does not generate the pulling force F, such that each of the two display panels 420 and the two cover films 440 are released from the pulling force to return to an original state thereof.

As discussed above, the flexible connecting film 450 is released when the tiled display 400 is in the folded state, and when the tiled display 400 is switched to the flat state, the flexible connecting film 450 wraps and stretches around the rotation structure 460 to generate the pulling force F for each of the display panels 420 and the cover films 440.

Figure 4C:
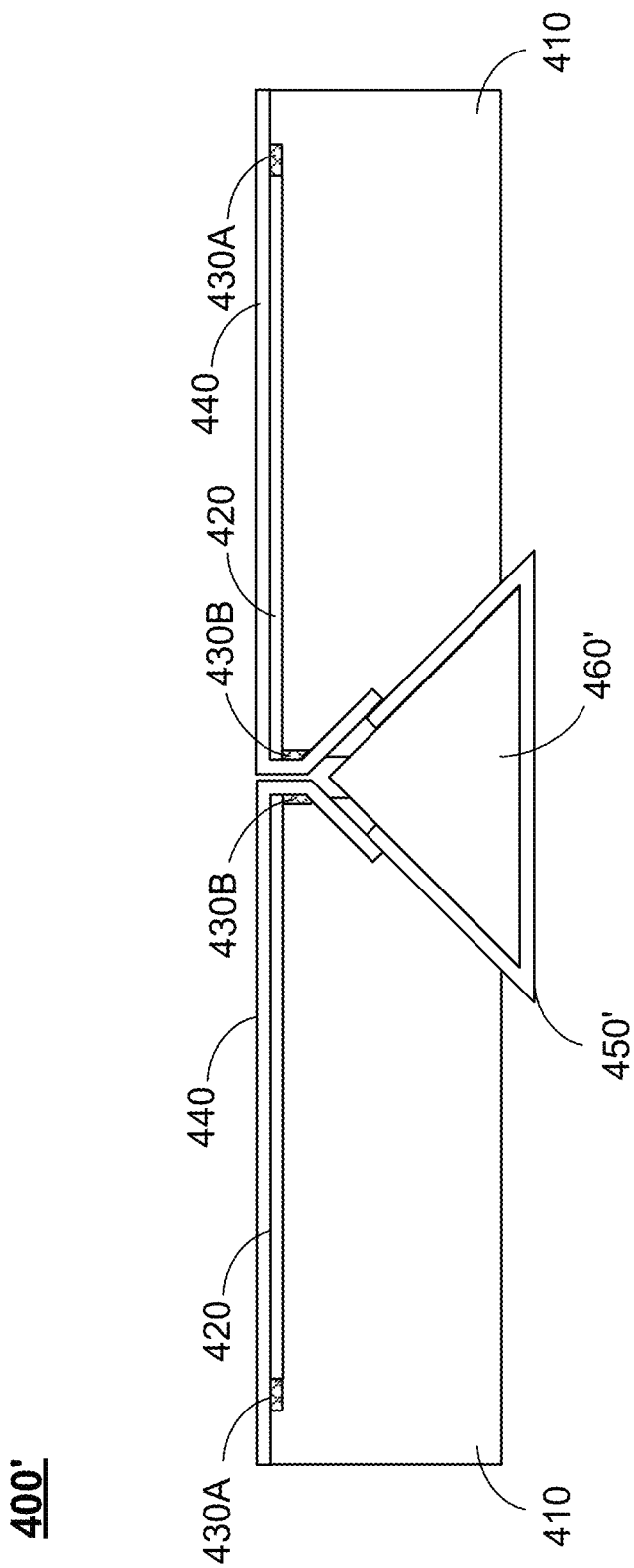
FIG. 4C schematically shows a tiled display in a flat state according to certain embodiments of the present disclosure.

As discussed above, the rotation structure 460 can be a cylinder structure having a circular-shaped cross-section. However, in certain embodiments, the shape of the rotation structure 460 can be varied and is not limited to the cylinder structure. For example, FIG. 4C schematically shows a tiled display in a flat state according to certain embodiments of the present disclosure. Specifically, the embodiment as shown in FIG. 4C is different from the embodiment as shown in FIGS. 4A and 4B in that the rotation structure 460' in the tiled display 400' as shown in FIG. 4D is in a triangular column shape. Thus, the flexible connecting film 450', which is wrapped around the rotation structure 460', also shows a different shape. Other structures in the tiled display 400', including the supporting plates 410, the display panels 420 and the cover films 440, are similar to the corresponding structures as shown in FIGS. 4A and 4B, and are thus not elaborated herein.

Figure 5A:
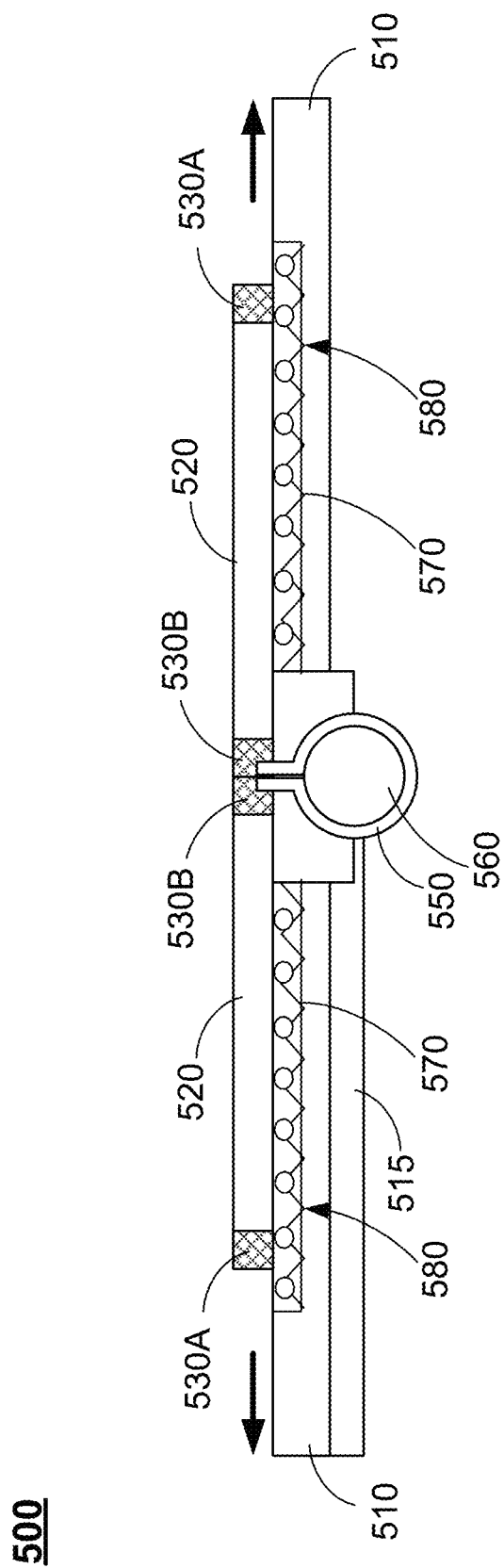
FIG. 5A schematically shows a tiled display in a flat state according to certain embodiments of the present disclosure.
Figure 5B:
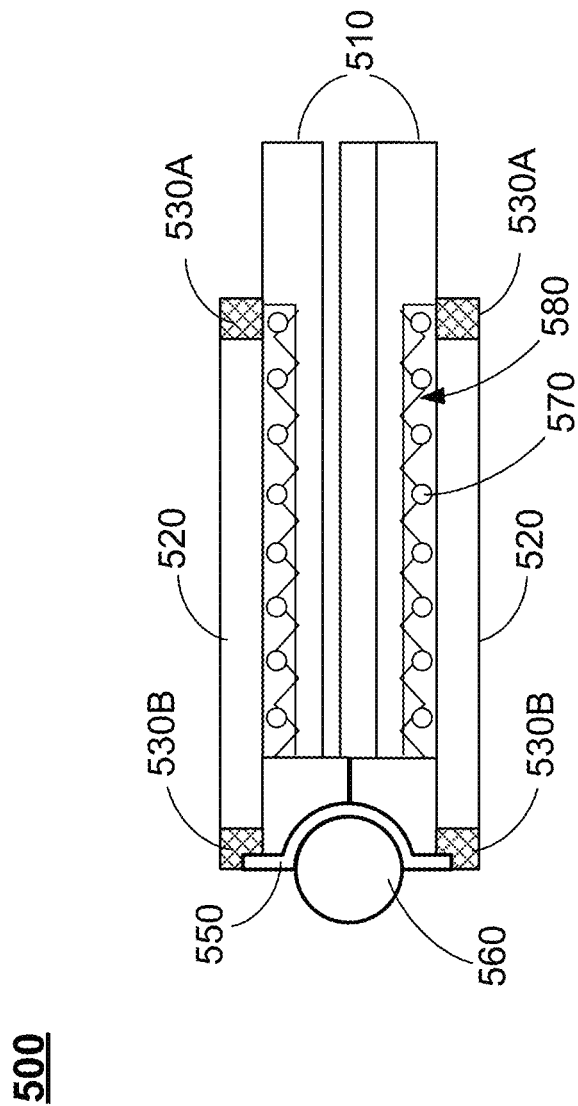
FIG. 5B schematically shows a tiled display in a folded state according to certain embodiments of the present disclosure.

In the embodiments as shown in FIGS. 4A and 4B, the outer BM area 430A of each display panel 420 is directly connected to the outer end of the corresponding supporting plate 410, thus connecting the display panel 420 and the corresponding supporting plate 410 together. However, the connection between the display panel 420 and the corresponding supporting plate 410 may be implemented at other positions and/or through other structures or mechanisms. For example, in certain embodiments, to further reduce the gap G between the two display panels 420, additional mechanisms may be provided in the supporting plates 410. For example, FIGS. 5A and 5B schematically show a tiled display according to certain embodiments of the present disclosure, where FIG. 5A shows the tiled display in a flat state, and FIG. 5B shows the tiled display in a folded state. Specifically, the embodiment as shown in FIGS. 5A and 5B is different from the embodiment as shown in FIGS. 3A and 3B in that two sliding mechanisms 570 and two elastic springs 580 are correspondingly provided in the two supporting plates 510 to allow the display panels 520 to slide on the supporting plates 510. As shown in FIGS. 5A and 5B, the tiled display includes two supporting plates 510, two display panels 520, a flexible connecting film 550 and a rotation structure 560.

The two supporting plates 510 are provided for correspondingly supporting the display panels 520 and other mechanisms of the tiled display 500. The two display panels 520 are respectively disposed on the two sliding mechanisms 570 in the two supporting plates 510. Each display panel 420 has an outer BM area 530A and an inner BM area 530B, and the area of the display panel 520 between the outer BM area 530A and the inner BM area 530B is a display area. The outer BM area 530A is connected to the elastic spring 580. The inner BM area 530B is indirectly connected to the flexible connecting film 550. The rotation structure 560 can be a cylinder structure having a circular-shaped cross-section, which is rotatably fixed to the inner ends of the two supporting plates 510. The flexible connecting film 550 has two ends respectively connected to the inner BM areas 530B of the two display panels 520. In this case, the rotation structure 560 and the two supporting plates 510 are disposed on two different sides of the flexible connecting film 550, allowing the two display panels 520 and the two supporting plates 510 to rotate around the folding structure such that the tiled display 500 is switched between the flat state as shown in FIG. 5A and the folded state as shown in FIG. 5B.

The two sliding mechanisms 570 and the two elastic springs 580 are correspondingly disposed on the two supporting plates 510. Each sliding mechanism 570 is disposed between a corresponding display panel 520 and the corresponding supporting plate 510, such that the display panel 520 can slide over on the sliding mechanism 570 relative to the corresponding supporting plate 510. Each elastic spring 580 is provided to connect the corresponding display panel 520 and the corresponding supporting plate 510, such that when the display panel 520 slides on the sliding mechanism 570, the elastic spring 580 may provide an elastic force to pull the display panel 520 back toward its original location. Specifically, the length of the two elastic springs 580 are provided such that each elastic spring 580 is in its original state without being stretched when the tiled display 500 is in the folded state.

As shown in FIG. 5A, when the tiled display 500 is in the flat state, the two display panels 520 and the two supporting plates 510 are rotated around the folding structure to be located on a display plane. In this case, the rotation structure 560 is located below the display plane. Meanwhile, the flexible connecting film 550 wraps and stretches around the rotation structure 560 to generate a pulling force for each of the display panels 520, and the pulling force generated by the flexible connecting film 550 would pull the two display panels 520 to slide on the sliding mechanism 570 inward and then downward from the display plane, such that the display areas of the two display panels 520 are located to be adjacent to each other to reduce a gap between the two display panels 520. Meanwhile, the two elastic springs 580, which are respectively connected to the outer BM area 530A of the display panels 520, are stretched by the pulling force generated by the flexible connecting film 550, and thus generating corresponding elastic forces outward (as shown in the arrows in FIG. 5A). In certain embodiments, the size of the display panels 520 and the elastic springs 580 may be adjusted such that the gap between the two display panels 520 may be minimized. For example, in one embodiment, the inner BM areas 530B may be pulled downward such that the display areas of the two display panels 520 are adjacent to each other.

As shown in FIG. 5B, when the tiled display 500 is in the folded state, the two display panels 520 and the two supporting plates 510 are rotated around the folding structure to be parallel to each other. In this case, the flexible connecting film 550 does not need to stretch around the rotation structure 560, and is thus released and does not generate the pulling force, such that each of the two display panels 520 are released from the pulling force. Further, the two elastic springs 580 are also released and return to their original states without being stretched, pulling the two display panels 520 to slide on the sliding mechanisms 570 back to their original locations.

Figure 5C:
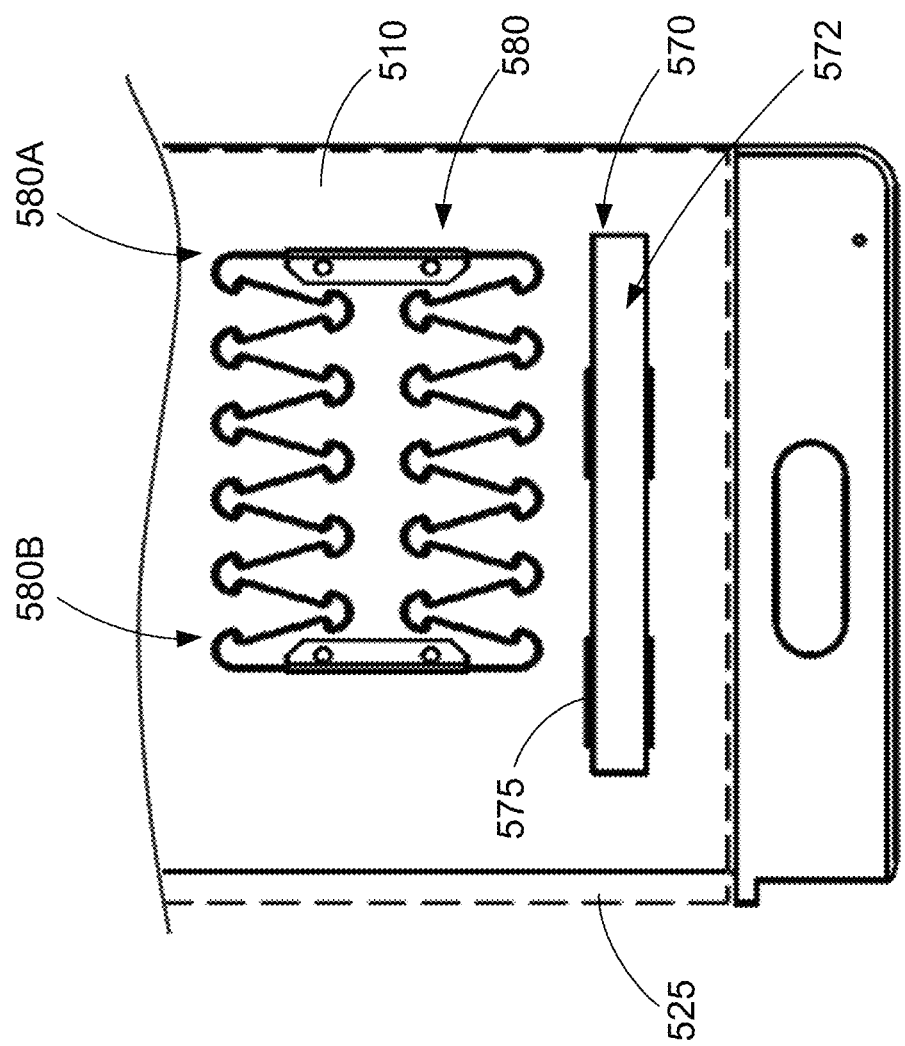
FIG. 5C schematically shows a partial top view of a set of the sliding mechanism and the elastic spring of a tiled display in a folded state according to certain embodiments of the present disclosure.
Figure 5D:
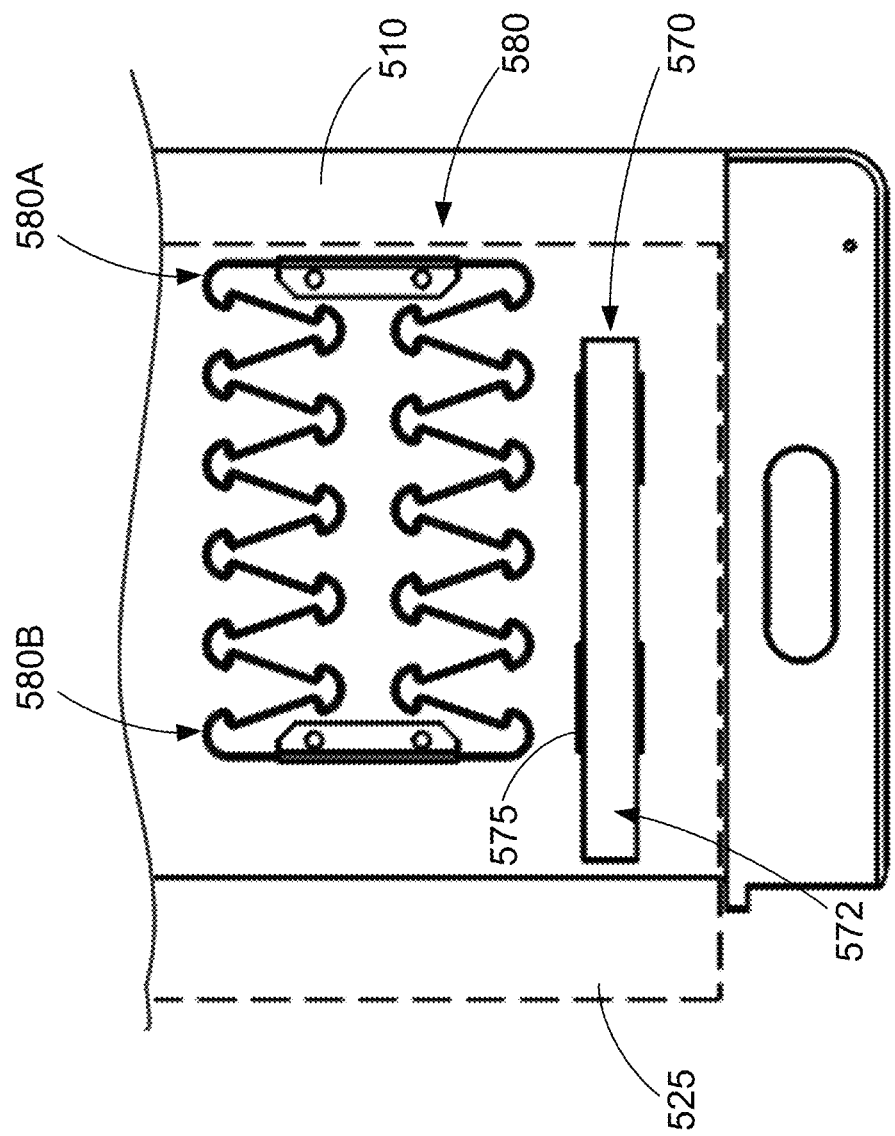
FIG. 5D schematically shows a partial top view of a set of the sliding mechanism and the elastic spring of a tiled display in a flat state according to certain embodiments of the present disclosure.

It should be particularly noted that FIGS. 5A and 5B merely show the sliding mechanisms 570 and the two elastic springs 580 schematically, without showing the actual positions or connections between the sliding mechanisms 570 and the two elastic springs 580 relative to the display panels 520 and the supporting plates 510. To further describe the movement of the sliding mechanisms 570 and the two elastic springs 580, FIGS. 5C and 5D schematically show partial top views of a set of the sliding mechanism and the elastic spring of a tiled display according to certain embodiments of the present disclosure. Specifically, FIG. 5C shows the tiled display in a folded state, and FIG. 5D shows the tiled display in a flat state. Further, only one set of the sliding mechanism 570 and the elastic spring 580 as well as a corresponding supporting plate 510 are shown in the partial views of FIGS. 5C and 5D. As shown in FIGS. 5C and 5D, the supporting plate 510 functions as a lower shell of the tiled display, and a frame 525 is provided as an upper shell of the tiled display, such that the display panel 520 (not shown) can be fixed to the frame 525. The sliding mechanism 570 includes a sliding rail 572 disposed on and fixed to the frame 525 (i.e., the upper shell), and multiple sliding blocks 575 fixed to the supporting plate 510. The sliding blocks 575 can slide in the sliding rail 572, allowing the frame 525 (as well as the display panel 520 fixed to the frame 525) to move relative to the supporting plate 510. Further, the elastic spring 580 includes two ends 580A and 580B. One end 580A of the elastic spring 580 is connected to the supporting plate 510, and the other end 580B of the elastic spring 580 is connected to the frame 525.

As shown in FIG. 5C, when the tiled display is in the folded state, the elastic spring 580 is in its original state, and the frame 525 (as well as the display panel 520 fixed to the frame 525) is also in its original state relative to the supporting plate 510. As shown in FIG. 5D, when the tiled display is in the flat state, the pulling force generated by the flexible connecting film 550 (not shown) pulls the frame 525 (as well as the display panel 520 fixed to the frame 525) to move toward the center of the tiled display (i.e., leftward as shown in FIG. 5D). In this case, the end 580B of the elastic spring 580 being connected to the frame 525 moves along with the frame 525, pulling the elastic spring 580 to stretch and generate an elastic force. Further, the sliding rail 572 disposed on and fixed to the frame 525 also moves along with the frame 525, such that the sliding blocks 575 fixed to the supporting plate 510 slide in the sliding rail 572, enabling the frame 525 (as well as the display panel 520 fixed to the frame 525) to slide leftward relative to the supporting plate 510. When the tiled display is switched back to the folded state, the elastic force generated by the elastic spring 580 pulls the end 580B back to its original position, as shown in FIG. 5C, such that the frame 525 (as well as the display panel 520 fixed to the frame 525) slides back to its original state. In this case, the sliding rail 572 disposed on and fixed to the frame 525 also moves along with the frame 525, such that the sliding blocks 575 fixed to the supporting plate 510 slide in the sliding rail 572 back to its original position.

Figure 6A:
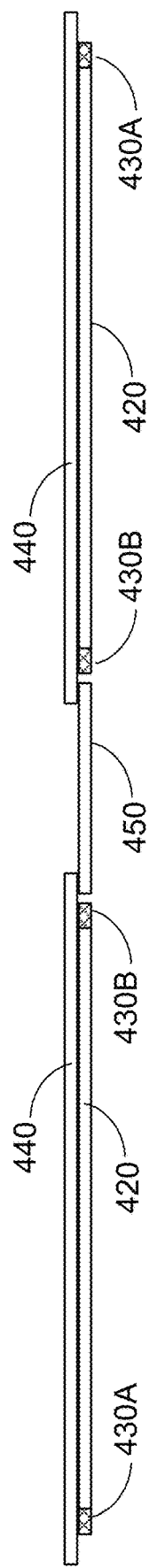
Figure 6B:
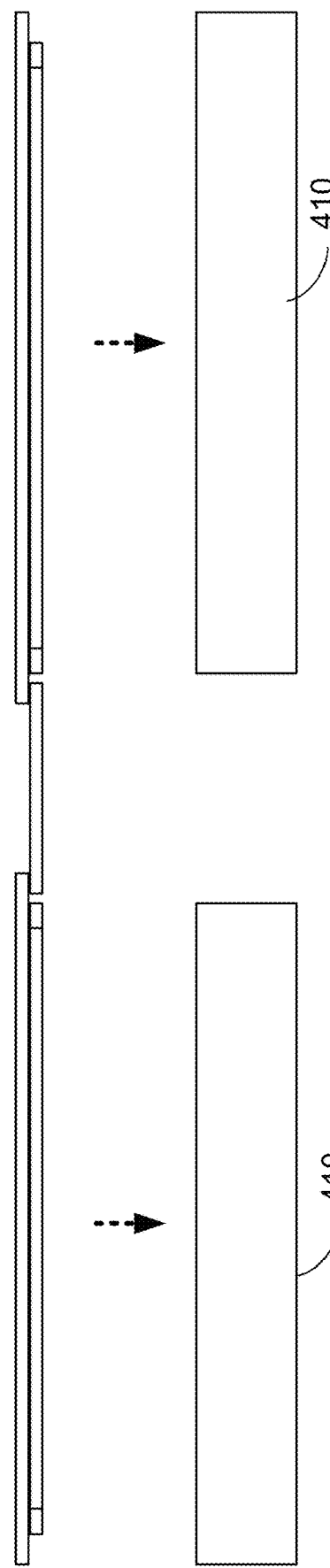

FIGS. 6A-6C schematically shows assembly of the tiled display as shown in FIGS. 4A and 4B according to certain embodiments of the present disclosure. As shown in FIG. 6A, the display panels 420, the cover films 440 and the flexible connecting film 450 are connected together. In this case, the flexible connecting film 450 remains flat. Then, the connected films are corresponding fixed to the supporting plates 410, as shown in FIG. 6B. Finally, the rotation structure 460 is pressed downward onto the flexible connecting film 450, and then fixed with the inner ends of the supporting plates 410 to obtain the structure of the tiled display 400 as shown in FIG. 4A.

Figure 7A:
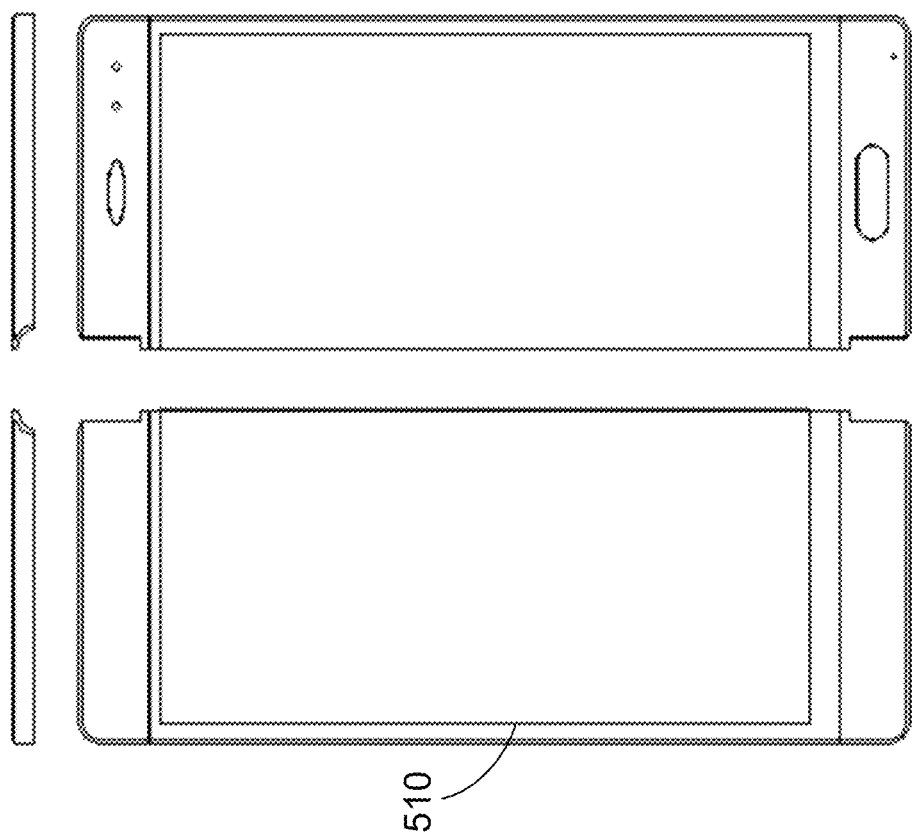
FIGS. 7A-7E schematically show an assembly process of a mobile device having the tiled display as shown in FIGS. 5A and 5B according to certain embodiments of the present disclosure.
Figure 7B:
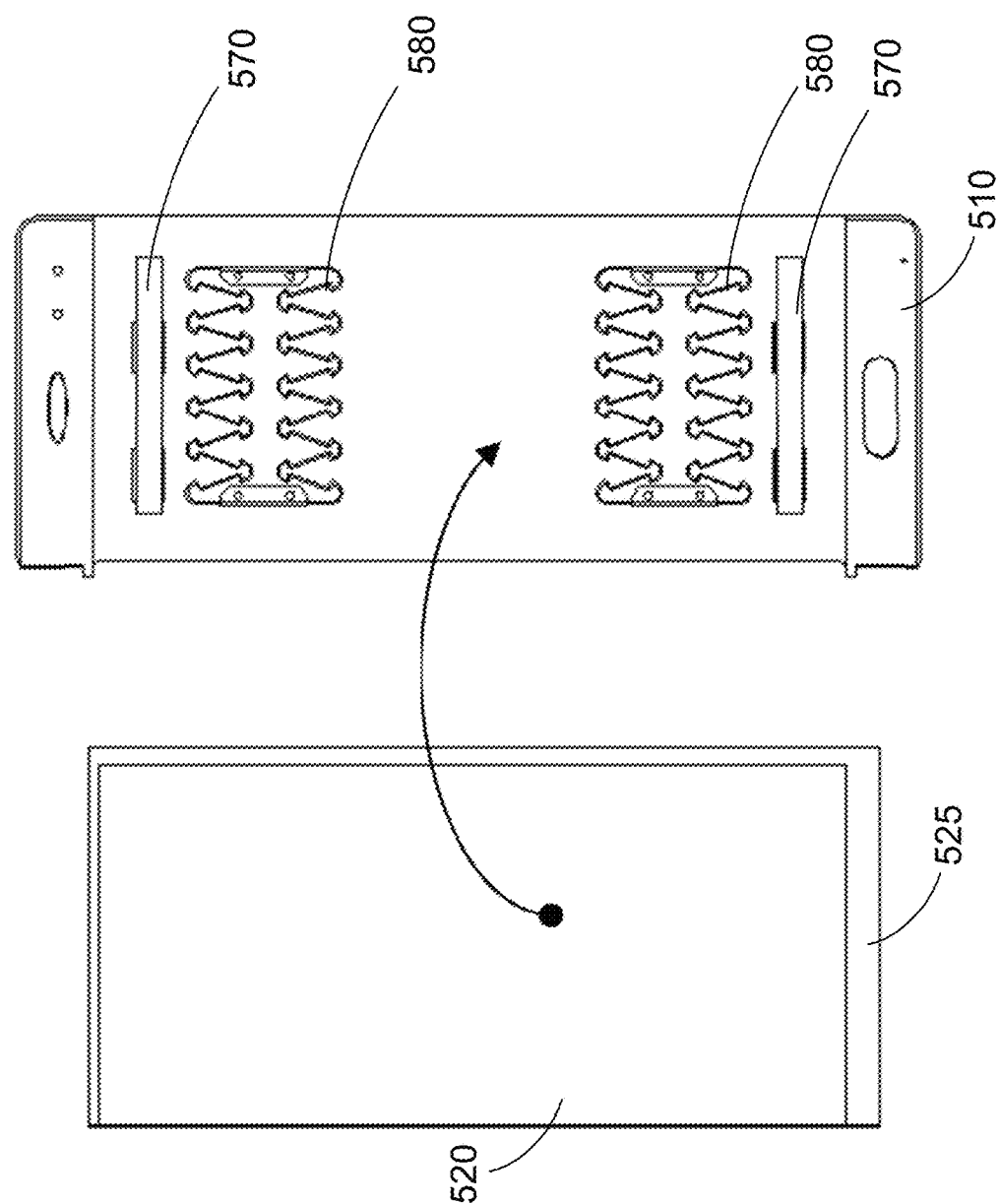
Figure 7C:
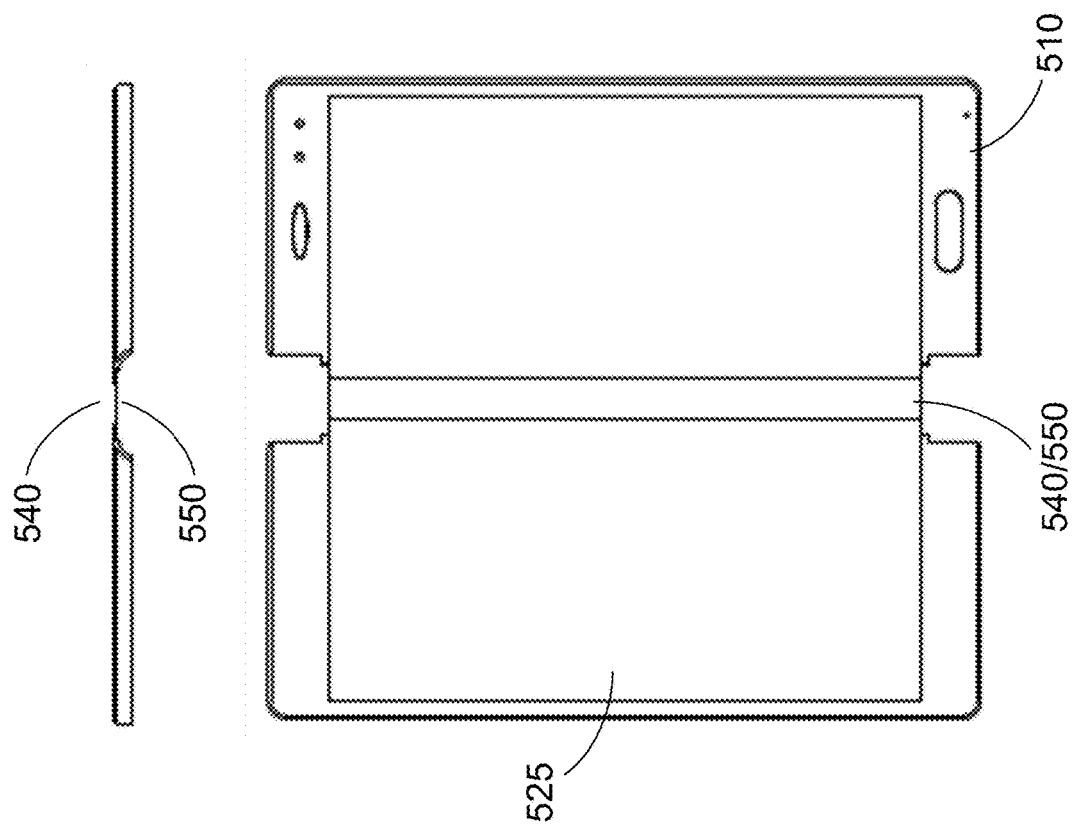
Figure 7D:
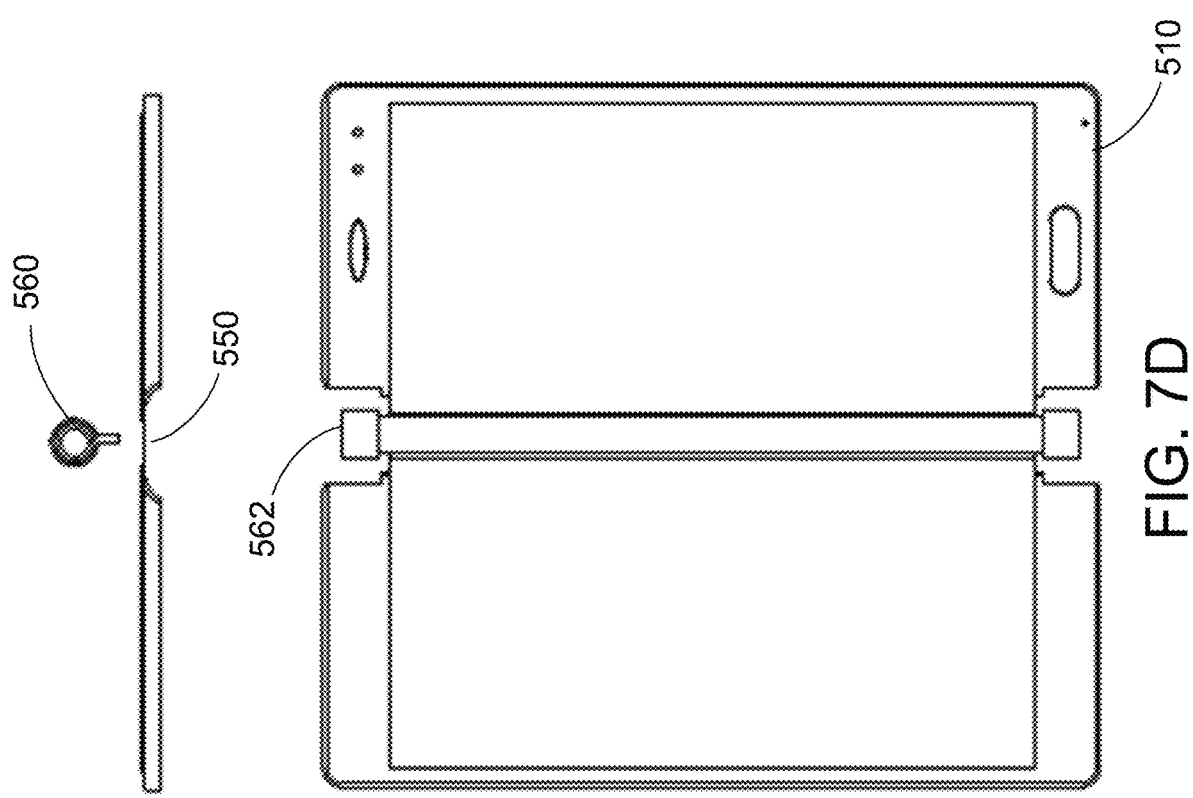
Figure 7E:
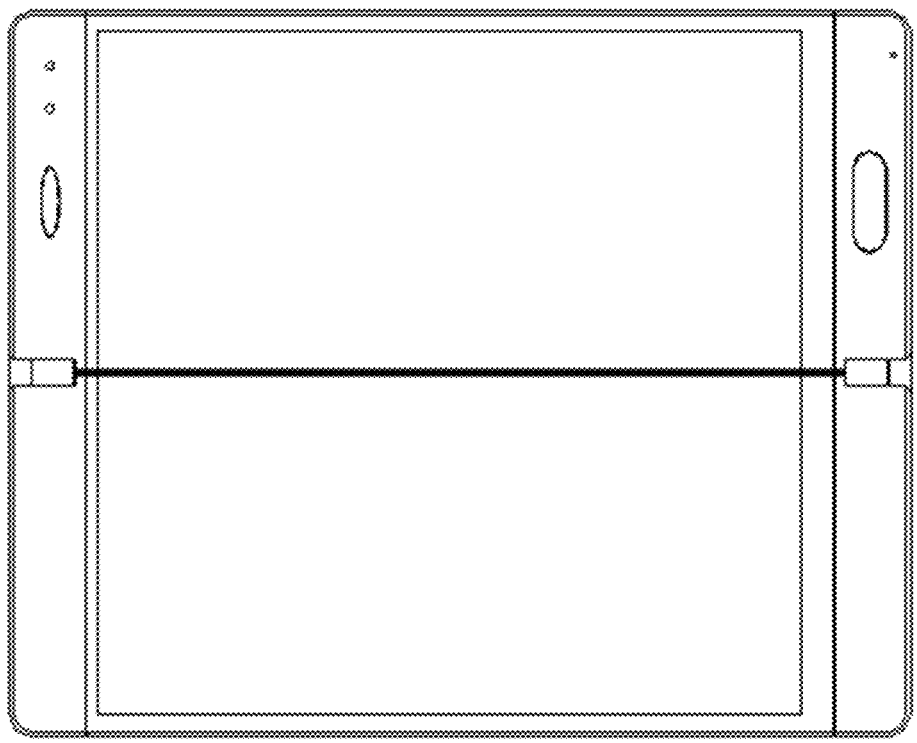
Figure 8B:
FIG. 8B schematically shows the mobile device in FIG. 7E in a folded state according to certain embodiments of the present disclosure.
Figure 8A:
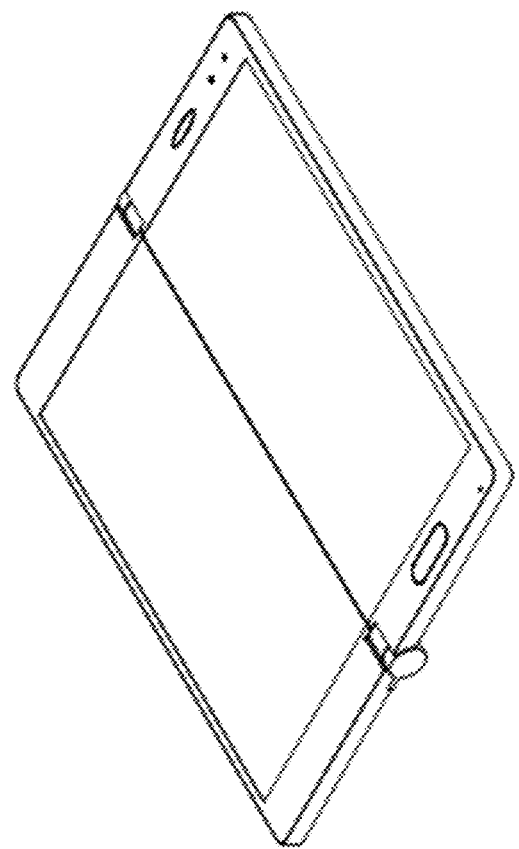
FIG. 8A schematically shows the mobile device in FIG. 7E in a flat state according to certain embodiments of the present disclosure.

FIGS. 7A-7E schematically show an assembly process of a mobile device having the tiled display as shown in FIGS. 5A-5D according to certain embodiments of the present disclosure. As shown in FIG. 7A, the two supporting plates 510 are provided. As shown in FIG. 7B, each supporting plate 510 is provided with the sliding mechanisms 570 and the elastic springs 580, and the frame 525 and the display panel 520 are assembled to the supporting plate 510 to form an assembled structure. Once the two assembled structures are obtained, a cover film 540 and the flexible connecting film 550 are attached to the two assembled structures, as shown in FIG. 7C. Then, the assembled structure can be connected with the folding structure, including the rotation structure 560, as shown in FIG. 7D. The rotation structure 560 can be fixed to the supporting plates 510 at the two ends 562 of the rotation structure 560. Finally, other components of the mobile device can be assembled to complete the mobile device 700, as shown in FIG. 7E. FIGS. 8A and 8B respectively show the mobile device in the flat state and the folded state.

FIG. 9A shows an enlarged view of the folding structure of the tiled display according to certain embodiments of the present disclosure, and FIG. 9B shows an enlarged view of the portion A of FIG. 9A. As shown in FIG. 9A, the inner edges of the frames 525 can be provided with round corners (see enlarged view in FIG. 9B). As shown in FIG. 9B, the display panel 520 extends to cover at least half of the round corner of the frame 525, and the cover film 540 covers the display panel 520 and further extend downward, such that the cover film 540 wraps around the round corner of the frame 525 to be connected to the corresponding end of the flexible connecting film 550.

The tiled display as discussed may be utilized in a portable device, such as a mobile device, a tablet device, or other portable electronic device that requires a display device, such that the portable device can be foldable.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A tiled display, comprising:
two supporting plates, each of the two supporting plates having an outer end and an inner end;
two display panels respectively disposed on and connected to the two supporting plates, wherein each of the two display panels has an outer black matrix (BM) area, an inner BM area, and a display area between the outer BM area and the inner BM area;
a folding structure provided in a folding area between the two display panels, the folding structure comprising:
a rotation structure rotatably fixed to the inner ends of the two supporting plates, wherein the two display panels and the two supporting plates are configured to rotate around the folding structure such that the tiled display is switched between a first state and a second state; and
a flexible connecting film having two ends respectively connected to the inner BM areas of the two display panels, wherein the rotation structure and the two supporting plates are disposed on two different sides of the flexible connecting film;
wherein when the tiled display is in the first state, the two display panels are rotated around the folding structure to be located on a display plane, the rotation structure is located below the display plane, and the flexible connecting film wraps and stretches around the rotation structure to generate a pulling force pulling the inner BM areas of the two display panels downward from the display plane, such that the display areas of the two display panels are adjacent to each other;
wherein when the tiled display is in the second state, the two display panels are rotated around the folding structure to be parallel to each other, and the flexible connecting film is released and does not generate the pulling force, such that each of the two display panels return to an original state thereof.

2. The tiled display according to claim 1, wherein each of the two display panels is an organic light emitting diode (OLED) display panel.

3. The tiled display according to claim 1, wherein the flexible connecting film is made of a flexible polymer or metal material.

4. The tiled display according to claim 1, wherein the flexible connecting film has a thickness of less than 200 um.

5. The tiled display according to claim 1, wherein the flexible connecting film has a Young's modulus of $E=10\sim70$ MPa.

6. The tiled display according to claim 1, wherein the rotation structure is a cylinder structure.

7. The tiled display according to claim 6, wherein a coating is provided on the rotation structure to reduce friction between the rotation structure and the flexible connecting film.

8. The tiled display according to claim 1, wherein the outer BM area of each of the two display panels is connected to the outer end of a corresponding one of the two supporting plates.

9. The tiled display according to claim 1, further comprising:
two elastic springs correspondingly disposed on the two supporting plates, each of the elastic springs connecting one of the two display panels and a corresponding one of the two supporting plates;
wherein when the tiled display is in the first state, the pulling force generated by the flexible connecting film pulls the two display panels to move toward each other, pulling the two elastic springs to stretch and generate elastic forces; and
wherein when the tiled display is in the second state, the elastic forces of the two elastic springs pulls the two display panels to move back to the original state thereof.

10. The tiled display according to claim 9, further comprising:
two frames, correspondingly fixed to the two display panels;
wherein each of the elastic springs has a first end and a second end, the first end of each of the elastic springs is connected to a corresponding one of the two frames fixed to the one of the two display panels, and the second end of each of the elastic springs is connected to the corresponding one of the two supporting plates;
wherein when the tiled display is in the first state, the pulling force generated by the flexible connecting film pulls the two display panels and the two frames to move toward each other, pulling the two elastic springs to stretch and generate elastic forces; and
wherein when the tiled display is in the second state, the elastic forces of the two elastic springs pulls the two display panels and the two frames to move back to the original state thereof.

11. The tiled display according to claim 10, further comprising:
two sliding mechanisms, correspondingly disposed between the two frames and the two supporting plates;
wherein when the tiled display is in the first state, the pulling force generated by the flexible connecting film pulls the two display panels and the two frames, such that the two sliding mechanisms enable the two display panels and the two frames to slide toward each other, pulling the two elastic springs to stretch and generate elastic forces; and
wherein when the tiled display is in the second state, the elastic forces of the two elastic springs pulls the two display panels and the two frames, such that the two sliding mechanisms enable the two display panels and the two frames to slide back to the original state thereof.

12. The tiled display according to claim 11, wherein each of the two sliding mechanisms comprises:
a sliding rail, disposed on and fixed to a corresponding one of the two frames; and
at least one sliding block, fixed to a corresponding one of the two supporting plates, and configured to slide in the sliding rail.

13. The tiled display according to claim 1, further comprising two cover films respectively disposed on the two display panels, wherein the flexible connecting film are connected to the inner BM areas of the two display panels by the two cover films.

14. The tiled display according to claim 1, wherein a distance between the two display panels is between 100 um and 550 um.

15. A portable device having the tiled display according to claim 1.

* * * * *